United States Patent [19]
Tirkkonen

[11] 3,722,611
[45] Mar. 27, 1973

[54] PATIENT SCALES

[76] Inventor: Erkki Tapio Tirkkonen, Kajavarannantie 3 as. 5, Helsinki 20, Finland

[22] Filed: Feb. 3, 1971

[21] Appl. No.: 112,111

[30] Foreign Application Priority Data

Feb. 5, 1970 Finland..................316/70

[52] U.S. Cl...............................177/144, 177/210
[51] Int. Cl......................................G01g 19/52
[58] Field of Search......177/132, 144, 208, 209, 210, 177/245

[56] References Cited

UNITED STATES PATENTS 3,338,323 8/1967 Swersey..............................177/144
3,124,770 3/1964 Ciavatta...........................177/211 X
3,060,732 10/1962 Corry...............................177/208 X
3,123,166 3/1964 Schellentrager....................177/132 X

*Primary Examiner*—George H. Miller, Jr.
*Attorney*—Kurt Kelman

[57] ABSTRACT

The invention disclosed is a device for weighing a patient confined in bed by using weight detecting elements or load cells disposed between each of the standard legs of the bed and the floor. The weight detecting elements are positioned in communication with a counting and indicating means for identification of the weight of the patient.

3 Claims, 4 Drawing Figures

PATENTED MAR 27 1973 3,722,611

PATIENT SCALES

The weighing of patients and continual observing of weight is of great importance in certain cases of illness. Mechanical scale devices have been constructed which when fitted on the bed construction are as a whole voluminous, heavy and are clumsy in construction. To remove these drawbacks, box-like power detecting elements have been suggested, placed between the upper part and lower part of the bed construction in appropriate places. Electric detecting elements for measuring and electric detector means may then be applied. Although the detecting elements proper may be small-sized, a special bed is, however, required and the possibility of weighing patients is limited to such special beds. For the purpose of removing this drawback, scale devices placed on the floor have been suggested, said devices being provided with rails on which the bed with wheels can be pushed for weighing. This involves the advantage that the bed need not be of any special type for the weighing. A drawback is, however, the rather voluminous apparatus which is difficult to move. Due to this the device is left in the same location, to which patients with beds are brought for weighing. This is, of course, inconvenient and it is not always possible to take this action, either.

It has now been found that by practice of the present inventions numerous above-described drawbacks of prior art devices are overcome by practice hereof which provides a simple patient weighing scales which involves several advantages in comparison with the well-known constructions described briefly above. Generally stated, the present patient weighing scales comprise four weight detecting elements carrying the bed and a device for counting and indicating the total weight on the basis of the outlets of these detecting elements. The patient scales according to the invention are characterized in that the detecting elements are separate, flat cells to be placed between the floor and the standard legs of the bed.

Certain embodiments of the invention are described in the following with reference to the attached drawing, where FIG. 1 shows perspectively the bed with patient scales.

Figure 1:
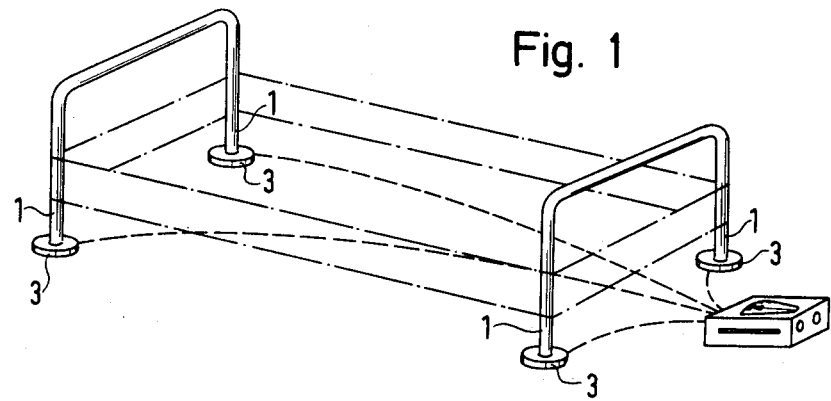
Figure 2:
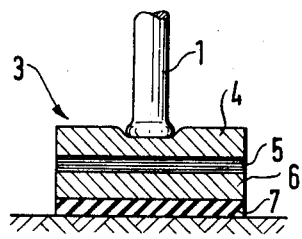
FIG. 2 shows a measuring cell fitted between the floor and the standard bed leg.
Figure 3:
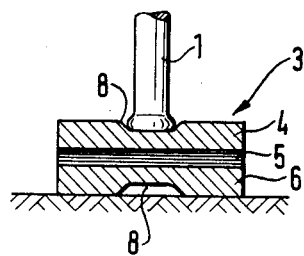
FIG. 3 shows another embodiment of the measuring cell.
Figure 4:
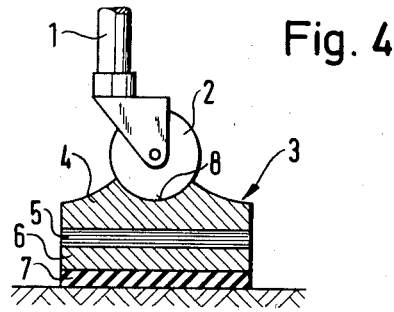
FIG. 4 shows the measuring cell fitted between the floor and the standard bed leg provided with a wheel.

In the drawing, bed lets 1, where indicated, have wheels 2 which legs or wheels may be situated on measuring cell 3. As it appears from FIG. 1, measuring cell 3 is fitted under each leg 1, so there are four cells altogether. The cell outlets are connected with a device for counting and indicating the total weight. The measuring cells 3 may, regarding their operation principle, be hydraulic or electric. Each cell will measure the weight caused by the leg situated upon the cell; and these patient weight values, when combined, will indicate the total weight of the bed and patient. FIG. 2 shows in greater detail that the measuring cell comprises a pancake having an upper layer 4, middle layer 5, lower layer 6 and bottom 7. The purpose of the upper layer 4 is to concentrate the load 1, for which there is an incision for the leg 1 (FIG. 2) and for the wheel 2 of the leg 1 a concave indentation 8 (FIG. 4). As illustrated by FIG. 3 the incision or indentation may be situated on each side of the weighing cell, whereat it does not matter in which direction this cell is situated on the floor.

The middle layer 5 will be pressed together which pressing together is used as a weight measure. The lowest layer 7 consists in the cases of FIGS. 2 and 4 of a friction surface, which prevents the measuring cell from sliding too much on the floor.

As it appears from the foregoing description referring to the embodiments illustrated by the drawings, the patient weighing scale according to the invention is very uncomplicated in construction and has all necessary requirements for producing an inexpensive device useful in hospitals. A bed with a special construction will not be needed, the patient can be weighed in any bed whatsoever. The device is also very light, so it can be transported from one place to another.

Being constantly in the measuring place, the scales according to the invention occupies only a small place and leaves the bottom of the bedstead rather free. The flat pancake construction of the measuring cells is particularly favorable, as the cells can easily be placed between the floor and the bed legs. A possibility like this has not existed until now, so the invention provides means which are a considerable improvement in comparison with the well-known devices.

It will be apparent from the foregoing description that variations of the present invention are possible, regardless of the principle used for weighing if the latter is effected by measuring cells, such as hydraulic pressure boxes connected by conduits with the device measuring and indicating the total weight, or electrical load cells connected as electronic weighing boxes.

I claim:

1. A patient weighing device which comprises, in combination, a bed having four legs, an individually removable weight detecting element disposed under each of said legs for supporting the bed, each of said removable weight detecting elements having an upper layer, a middle layer and a lower layer, said upper layer having a concave indentation and providing a load concentrating surface, said middle layer comprising pressure weight measure means and said lower layer comprising a support surface, said removable weight detecting elements each in communication with a counting and indicating device for identification of weight of the bed detected by the weight detecting elements under the bed legs.

2. The patient weighing device of claim 1, wherein the weight detecting elements are electrical detecting elements.

3. The patient weighing device of claim 1, wherein the bottom surface of each weight detecting element opposite said upper layer consists of a friction layer for decreased sliding of the elements on the floor.

* * * * *